United States Patent [19]

Greenberg et al.

[11] Patent Number: 4,987,024
[45] Date of Patent: Jan. 22, 1991

[54] BATTERY SEPARATOR FABRIC AND RELATED METHOD OF MANUFACTURE

[75] Inventors: Ronald Greenberg, Worcester; Randy Rogers, Holliston, both of Mass.; Roland Bernier, Athens; Stanley Littman, Rosell, both of Ga.

[73] Assignee: International Paper Company, Purchase, N.Y.

[21] Appl. No.: 294,859

[22] Filed: Jan. 9, 1989
(Under 37 CFR 1.47)

Related U.S. Application Data

[63] Continuation-in-part of Ser. No. 867,856, Feb. 13, 1986, abandoned.

[51] Int. Cl.$^5$ .............................................. D04H 1/04
[52] U.S. Cl. .................................... 428/219; 428/220; 428/284; 428/286; 428/288; 428/296; 428/332
[58] Field of Search ............... 428/284, 286, 296, 218, 428/220, 219, 304.4, 332, 308.4, 311.1, 311.5, 311.7, 288

[56] References Cited

U.S. PATENT DOCUMENTS

| | | | |
|---|---|---|---|
| 2,161,383 | 6/1939 | Reinhardt et al. | 136/146 |
| 2,677,008 | 9/1949 | Fairclough et al. | 136/146 |
| 2,930,829 | 3/1960 | Jacquier | 136/143 |
| 3,186,876 | 6/1965 | Piechon | 136/143 |
| 3,811,957 | 5/1974 | Buntin | 136/146 |
| 3,914,501 | 10/1975 | Miller et al. | 428/296 |
| 3,933,525 | 1/1976 | Palmer et al. | 136/146 |
| 3,972,759 | 8/1976 | Buntin | 156/167 |
| 4,068,047 | 1/1978 | Dangel et al. | 429/142 |
| 4,091,140 | 5/1978 | Harmon | 428/288 |
| 4,127,706 | 11/1978 | Martin et al. | 429/122 |
| 4,128,679 | 12/1978 | Pohland | 428/131 |
| 4,168,195 | 9/1979 | Anderson et al. | 156/181 |
| 4,315,965 | 2/1982 | Mason et al. | 428/198 |
| 4,353,969 | 8/1982 | Rippel et al. | 429/144 |
| 4,363,682 | 12/1982 | Thiebault | 156/181 |
| 4,373,000 | 2/1983 | Knoke et al. | 428/198 |
| 4,422,892 | 12/1983 | Plant | 156/209 |
| 4,436,780 | 3/1984 | Hotchkiss | 428/198 |

OTHER PUBLICATIONS

Celanse Corporation, Brochure entitled: Celgard ® Microporous Film, Nov. 1981.
Celanese Corporation, Brochure entitled: Celgard ® Microporous Polypropylene Film, Nov. 1980.

Primary Examiner—Lorraine T. Kendell
Attorney, Agent, or Firm—Francis J. Clark

[57] ABSTRACT

A battery separator fabric comprising a nonwoven fibrous web of thermoplastic fibers having top and bottom surface fibers and inner fibers. The surfaces of the top and bottom surface fibers of the fibrous web are seared and fused together to form film-like surfaces having pores, while the surface fibers and inner fibers of the web remain substantially unaffected. Searing and fusing of the surface fibers are accomplished by simultaneously applying heat to the top and bottom surfaces of the fibrous web so as to sear the surfaces of the thermoplastic fibers, and pressure to insure that the seared fibers make contact with each other to secure themselves together. As the seared fibers make contact with each other, film-like surfaces are formed with pores being created in the surfaces. The pores are created because a majority of spaces remain between the surface fibers. In addition, the heat and pressure are controlled by varying the temperature and pressure so that the surface fibers and the inner fibers of the fibrous web are substantially unaffected. The unaffected top and bottom and inner fibers along the porous film-like surfaces, permit the fibrous web to substantially retain its original porosity. This results in a film-like fabric having excellent porosity, which is well-suited as a battery separator.

14 Claims, 1 Drawing Sheet

BATTERY SEPARATOR FABRIC AND RELATED METHOD OF MANUFACTURE

CROSS REFERENCE TO RELATED APPLICATION

This application is a continuation-in-part of U.S. Serial No. 867,856 filed Feb. 13, 1986, now abandoned.

BACKGROUND OF INVENTION

1. Field of Invention

This invention relates to porous fabrics that may be used as filters, membrane supports, or more specifically, as battery separator fabrics.

2. Prior Art

One of the most difficult problems that has been encountered today in the battery separator art, is to economically provide a porous fabric for use as a battery separator. Although the prior art has developed a microporous film that is used as a battery separator, it has not produced a porous fabric or a film that is economical to use. The present invention has succeeded in providing a porous fabric that is inexpensive to produce where the prior art has not.

Typical prior art porous fabric is such as that made by the Celanese Corporation, located in Charlotte, N.C., under the trade name "Celgard." This prior art film is an extruded plastic film that is drawn out to make it porous. Drawing out is defined as a stretching process. Drawing of the film is done so as to make fractures occur in the film. There are disadvantages with this prior art. One such disadvantage is that it is very expensive to produce the porous fabric due to the number of process steps. Because the porous fabric is expensive to produce, the selling costs are high. Another disadvantage of this prior art is that the porous film is over engineered for use as a battery separator. Micropores formed in the fabric are too small in size for the film to be economically used as a battery separator. The pores in the prior art range between 0.02 and 0.04 microns. This is a range that is far below what is necessary in a battery separator. The allowable range of pore sizes in battery separator fabrics is preferably between 1 to 12 microns, with an average of 6 microns.

The present invention provides sufficient flow and sufficient barrier properties to serve as well or better than the prior art and is less expensive to produce.

In U.S. Pat. No. 4,472,328, there is described a porous film or sheet. The prior art porous film is made by melt-molding a resin selected from a group consisting of a linear low density polyethylene, a high density polyethylene and a polypropylene into a film or sheet. The film or sheet is then drawn out or stretched. During the stretching of the film, the film fractures, thus producing pores within the film or sheet.

This prior art has the same disadvantages as the previously mentioned prior art.

The present invention is superior to the prior art by reason of its economy, and more realistically fits the requirements of a battery separator material.

An object of the present invention is to provide a porous fabric that is more economical to produce than prior art.

Another object of the present invention is to provide a porous fabric that may be used as a battery separator.

BRIEF DESCRIPTION OF THE INVENTION

A battery separator fabric comprising a nonwoven fibrous web of thermoplastic polypropylene fibers, having top and bottom surface fibers and inner fibers. The surfaces of the top and bottom surface fibers of the fibrous web are seared and fused together by simultaneously applying heat and pressure. The heat and pressure are applied to the top and bottom surfaces of the fibrous web by a pair of steel rolls. The heat is controlled so that it sears only the tops of the surface fibers while substantially leaving the top and bottom and inner fibers of the web unaffected. As the surface fibers are being seared, pressure is applied to insure that the seared fibers make contact with each other, thus securing themselves together. As the seared fibers make contact with each other they fuse together forming porous film-like top and bottom surfaces.

These pores are formed because a majority of spaces remain between the substantially unaffected surface fibers. The unaffected surface fibers and the inner fibers along with the porous film-like surfaces, permits the fibrous web to substantially retain its original porosity. This results in a film-like fabric having excellent porosity.

BRIEF DESCRIPTION OF THE DRAWINGS

The objects and advantages of the present invention will become more apparent when viewed in conjunction with the following drawings in which.

DESCRIPTION OF THE PREFERRED EMBODIMENT

The present invention relates to porous fabrics, more specifically to porous fabrics utilizable as separators in Lithium Batteries.

The present invention is made by producing a fibrous web of thermoplastic fibers formed by carded, air laid, wet laid, meltblown or spunbond process means, and passing this web between a pair of steel rolls that are heated and that have pressure applied to them. The web may have a weight of between 20–40 grams per square yard (gsy) while the preferred is about 36 gsy. The heat from the rolls sear the top and bottom surfaces of the surface fibers of the fibrous web. The web preferably has a thickness in the range of 1–20 mils prior to application of pressure by the rolls and approximately 2–3 mils following searing.

Searing is defined for the purposes of this application as the minimum flowing of a thermoplastic fiber so as to substantially create a change in its surface structure. The temperature and pressure of the rolls is controlled so that the fusion gradient will create stick points between the surface fibers, while permitting the top and bottom and inner fibers to remain substantially as fibers. The fusion gradient is defined for the purposes of this application as the temperature gradient across the web mass, while the web is in the nip of a pair of rolls, so as to only sear the surfaces of the surface fibers to create stick points. Stick points are defined for the purpose of this application as the lowest level of initial adhesion between adjacent fibers. The rolls, when pressure is applied to them cause the seared fibers to spread out and contact other surface fibers to form top and bottom film-like surfaces while at the same time securing themselves together. It should be noted that a majority of the top and bottom surface fibers and the inner fibers of the web are substantially unaffected by the heat and the pressure of the rolls and remain essentially in their original state as whole fibers. Because a substantial amount of the seared thermoplastic fibers remain as whole fibers, spaces or pores remain between the fibers in the fibrous web, permitting the web to remain porous.

Figure 1:
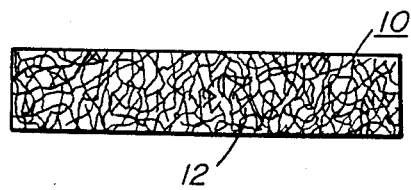
FIG. 1 is a cross-sectional view of the present invention fabric to show the fibrous web.
Figure 2:
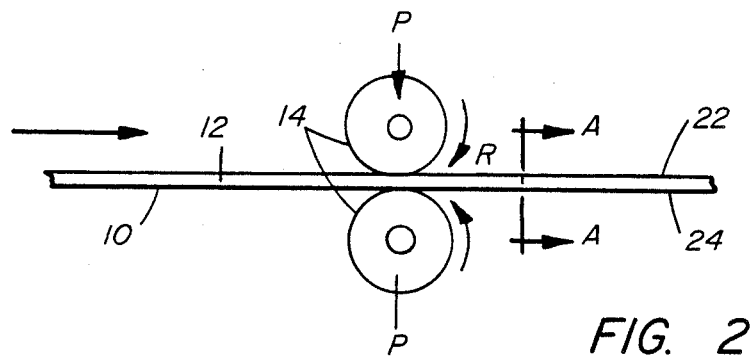
FIG. 2 shows the fabric passing between the heated pressurized rolls.

FIG. 1 illustrates the initial stage of the present invention, which is a nonwoven fibrous web 10 of thermoplastic polypropylene fibers 12. As shown in FIG. 2, the fibrous web 10 is passed between an arrangement of steel rolls 14, only two being shown, that are heated and that have pressure applied to them. Although it is preferred that the rolls be made from steel, other conventional materials may be used. These rolls may be heated to a temperature between 250° F. and 320° F., with the preferred temperature being 289° F. The pressure "P" applied to the rolls also subjects the fibrous web to a pressure of between 18,000-50,000 psi with the preferred pressure being 45,000 psi. The rolls 14 are empowered to rotate about their axes, as indicated by the arrows "R" in FIG. 2.

As the fibrous web 10 is passed between the nip of the rolls, the thermoplastic polypropylene fibers 12 on the top and bottom surfaces of the web that come in contact with the heated nip rolls, are seared. As these fibers are seared the pressure applied on the rolls causes the seared material to flow thus contacting other surface fibers and becoming secured thereto to form film-like porous surfaces. Temperature and pressure are critical parameters in the searing process which vary within definite ranges for different nonwoven materials as particularized in Examples set forth in this specification.

A preferred nonwoven web for fabricating the battery separator of the invention comprises polypropylene. The preferred web 10 is composed of a blend of 90 percent fine 0.5 denier, 38 mm long polypropylene manufactured by Diawabo of Japan (Diawabo Type PN), and 10 percent 15 denier, 38 mm long polypropylene manufactured by Hercules Inc., Norcross, Ga. (Type T-188). Fine denier finers such as the Diawabo Type PN are preferred for use in fabricating separator materials of the invention as they permit use of large numbers of fibers in the web. It will be appreciated that such a blend of fibers obtains a uniform distribution of fibers and porosity in the fabric. Further advantage in this blend is obtained in that polypropylene fibers have a wide melting range which permits controlled fusion of fibers in the fabric.

Although polypropylene fibers are the preferred fibers, other fibers such as polyamide, polyester, polysulfone, polyphenylene sulfides, cellulosic or blends thereof may be used with slightly different results.

A preferred application of the battery separator is in lithium batteries. For example, $Li/SO_2$, and $Li/MNO_2$. It will be appreciated by those skilled in the art that such applications require use of fibers which are inert to lithium. Polypropylene and other polyolefins meet this requirement.

Figure 3:
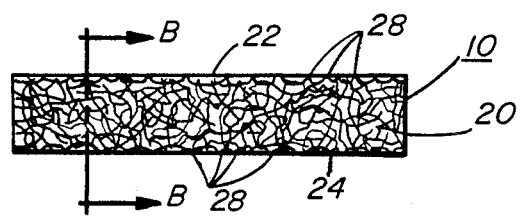
FIG. 3 is a cross-sectional view taken along the line A—A of FIG. 2 after the fabric has passed between the heated pressurized rolls.
Figure 4:
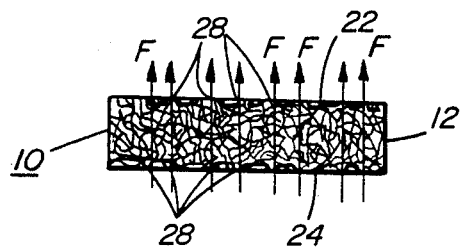
FIG. 4 is a cross-sectional view taken along the line B—B of FIG. 3 to illustrate the porous nature of the fabric.

In accordance with the invention, heat and pressure parameters of the searing process are selected to produce a fabric that has an arrangement of film-like top 22 and bottom 24 surfaces and a plurality of pores 28 therein, as shown in FIGS. 3 and 4.

As the fibers on the top 22 and bottom 24 surfaces, as shown in FIGS. 2 and 3, are seared, a substantial amount of open area or spaces remain on these surfaces, thus leaving the pores 28 therewithin, permitting the fabric to remain porous. Fibers in the fabric interior are substantially unaffected by the searing process to yield a fabric which is uniformly porous.

The fibrous web employed in the invention preferably has a thickness in the range of 1-20 mils prior to searing and 2-3 mils following the searing process. The film-like porous surfaces of the fabric are formed by controlled molten flow of thermoplastic fibers which comprise the fabric surfaces. To further illustrate the unique structure of the present invention, FIG. 4, the cross-sectional view of FIG. 3, shows the top surface 22, the bottom surface 24, the unaffected inner fibers 12 and the pores 28 that remain after the seared material is cooled. FIG. 4 also shows the porosity of the fabric, by illustrating the passage of a fluid indicated by arrows "F," disposed therethrough. As illustrated in FIG. 4 the pores 28 in the top 22 and bottom 24 surfaces along with the unaffected inner fibers 12 permit substantial porosity 30 throughout the fabric.

In testing the fabric it was unexpectedly found that the fabric retained substantial porosity throughout.

Porous construction in fabrics is necessary if the fabrics are to be used in batteries. Porosity is essential because the pores in a fabric permit ionic contact to take place by allowing electrolytes to pass through them, thus making a connection between the electrodes. The porous fabric thus performs a needed function. A non-porous or semi-porous film does not permit sufficient passage of electrolytes to take place between the electrodes in a battery, thus restricting ionic contact.

By using polypropylene fibers in the present invention, it has price and performance advantages over the prior art. Another advantage the present invention has over the prior art is that it can deliver the same performance or better performance as the prior art at a substantially lower price.

The prior art is over-engineered for use as a battery separator because its pore size is finer than required in many battery separator applications.

Still another advantage that the present invention has over prior art is that it can provide a cell life and cell voltage performance equivalent or better than the prior art, even though the present invention has larger pores and much wider pore distribution.

Table 1 is a compilation of test results between the preferred fabric of the present invention and a sample of the prior art Celanese "Celgard" barrier fabric. Both samples were compared to the allowable range of properties that are necessary in a fabric, if it is to be used as a battery separator. Physical properties set forth in Table I correspond to fabrics of Examples I-III.

TABLE I

| Physical Property | Allowable Range | Prior Invention | Present Invention Preferred | Range |
|---|---|---|---|---|
| Fabric weight (gsy) | 20–40 | 10–12 | 36 | 32.6–40.1 |
| Thickness (mil) | 1–4 | 1.0 | 2.5 | 1–3 max. |
| Void Volume (%) | min. 30 | 38–46 | 32 | 28–45 |
| Tensile, Dry (lb/in) MD/CD | 7–10/2–4 | 20/2 | 8/2 | min. 4/1 |

TABLE I-continued

| Physical Property | Allowable Range | Prior Invention | Present Invention Preferred | Present Invention Range |
|---|---|---|---|---|
| Burst, Dry (psig) | | | 13 | min. 11 |
| Air Permeability Frazier (CFM/F$^2$) | 0–6 | 0 | 3.0 | 1.6–6.0 |
| Pore size (microns): | | | | |
| maximum | 90 | — | 35 | 20–60 |
| mean | 1–12 | 0.02–0.04 | 6.5 | 1–12 |
| Fiber Size (microns) | | | greater or equal to 180 | |
| Apparent Density (g/cc) | | | 0.67 | max. 0.72 |
| Internal Resistance Electrolyte composition-KOH (35%) (milliohm/CM$^2$) | 10–50 | 2.5–10 | 29 | 2.5–10 |
| Initial Cell Voltage (Volts) | min. 2.0 | 2.5 | 2.7 | 2.5–2.7 |

As indicated in the table, the present invention permits a cell voltage that is higher than the prior art despite the higher average pore size and higher internal resistance. A high cell voltage is a key requirement in fabric for suitable performance as a battery separator.

The prior art, although suited for use as a battery separator, has pores that are too fine for the particle size migrations it must resist.

The present invention battery separator has distinct advantages over the prior art, because it provides adequate filtration and improved void volume, while doing both at a substantially lower cost than the prior art.

Examples of the present invention fabric are set forth below. The examples are not intended to limit the scope of the invention.

EXAMPLE I

A nonwoven fibrous web composed of 90% 0.5 denier (Daiwabo Type PN) and 10% 1.5 denier (Hercules Type T-188), 38 mm long polypropylene fibers is produced on web forming equipment such as cards, air formed, melt blowing, continuous filament or even wet-lay equipment and weighing about 36 grams per square yard is passed between the nip of two steel rolls that are heated and have pressure applied to them. The rolls 14 are heated to a temperature of between 288° F. and 289° F. and are held in contact under pressure load of approximately 45,000 psi. The web travels through the nip of the rolls as they rotate in the direction indicated by "R" in FIG. 2 at a speed of between 20 and 60 feet per minute. The web has a thickness of between about 2–3 mils after passing through the nips.

As the web contacts the heat, the surface of the polypropylene fibers on the top and bottom surfaces of the web are seared. As the fibers are being seared, the pressure exerted on the rolls, causes the seared fibers to make contact with each other securing themselves together. This results in film-like surfaces being formed on the top and bottom of the fabric while leaving the surface fibers substantially as fibers. A majority of the polypropylene fibers within the web also remain substantially unaffected by the heat and pressure, thus retaining their original state as fibers.

Because the top and bottom fibers remain as whole fibers the initial porosity of the fibrous web is retained, thus permitting the web structure to retain porosity throughout. Physical properties of the fabric of this Example are set forth in Table I. Advantageously, the fabric has a higher air permeability than the prior art which is a direct result of the pore size in the fabric. It will be recognized that this feature makes the fabric well suited for use as a battery separator.

EXAMPLES II–III

Alternative embodiments of the separator fabric of the invention were produced employing different web materials. Process conditions were similar to those set forth in Example I except pressure and temperature ranges were adjusted to accommodate material characteristics of the fabric. Physical properties of the fabrics of Examples I and II are substantially the same as in Example I and are set forth in Table I.

Example II employs a fibrous web 10 having a fiber blend composed of a 90% bicomponent polypropylene/polyethylene 0.9 denier fiber, 38 mm long, and 10% polypropylene 1.5 denier fiber, 38 mm long. The preferred bicomponent is manufactured by Chisso Company of Japan and offered under product designation Type ES fiber. Type ES fiber has a polypropylene core and polyethylene exterior sheath which has a low melting temperature and facilitates the searing process. The 10% polypropylene fiber is Hercules T188 polypropylene (1.5 denier, 38 mm long) fiber. Processing is the same as in Example I except that the temperature of the rolls is in range of 250–252° F.

Example III employs a fibrous web 10 composed of 90% T188 polypropylene, 0.65 denier, 38 mm long and 10% Hercules T188 polypropylene, 1.5 denier, 38 mm long fiber. Processing is the same as in Example I except that the rolls have a temperature in the range of 263–265° F.

EXAMPLE IV

The web in this Example is composed of 100% Hercules T188 (1.5 denier, 38 mm long) polypropylene fibers. Processing conditions are the same as set forth in Example I except for variations in the temperature and pressure load parameters. The rolls in this Example are heated to a temperature of approximately 300° F., and the pressure load applied to the web is approximately 27,000 psi. Table II sets forth physical properties of the barrier fabric produced in this Example.

TABLE II

| Physical Property | Allowable Range | Prior Invention | Present Invention Preferred | Present Invention Range |
|---|---|---|---|---|
| Fabric weight (gsy) | 20–40 | 10–12 | 36.5 | 32.6–40.1 |
| Thickness (mil) | 1–4 | 1.0 | 2.5 | 1–3 max. |
| Void Volume (%) | min. 30 | 38–46 | 56 | |
| Tensile, Dry (lb/in) MD/CD | 7–10/2–4 | 20/2 | 9.8/1.8 | min. 4/1 |
| Air Permeability Frazier (CFM/F$^2$) | 0–6 | 0 | 1.88 | 1.6–6.0 |
| Pore size (microns): | | | | |
| maximum | 90 | — | 80 | |
| mean | 1–12 | 0.02–0.04 | 8.0 | 1–12 |
| Internal Resistance Electrolyte composition-KOH (35%) (milliohm/CM$^2$) | 10–50 | 2.5–10 | 29 | 2.5–10 |
| Initial Cell Voltage (Volts) | min. 2.0 | 2.5 | 2.7 | 2.5–2.7 |

From the foregoing, it will be recognized that the invention achieves the objects set forth herein. In particular, a low cost porous battery separator fabric has been disclosed which is of reduced thickness to maximize space for active battery components. The separator fabric of the invention has particular application in long life lithium batteries where space for battery components is of critical importance. Advantage is obtained in the invention by use of a high pressure controlled searing process which yields a uniformly porous separator fabric.

Although the invention has been described with reference to certain preferred embodiments, it will be appreciated that other separator fabrics may be devised, which are nevertheless within the scope and spirit of the invention as defined by claims appended hereto.

What is claimed is:

1. A battery separator fabric for use in a battery comprising:
   a nonwoven fibrous web of polyolefin fibers, having top and bottom surface fibers and inner fibers, the surfaces of said top and bottom surface fibers being seared by heat and pressure causing only the surfaces of said top and bottom surface fibers to spread out contacting other surface fibers so as to form top and bottom film-like surfaces on said web, the original state of said fibers being otherwise substantially unaffected by said heat or pressure;
   said film-like surfaces having a plurality of pores disposed therein, said plurality of pores permitting ionic migration to occur in the battery by allowing electrolytes to pass through said pores;
   said nonwoven fibrous web having a thickness prior to being seared of approximately 1–20 mils, such that the separator fabric has a thickness of approximately 2–3 mils, and percent void voume in the range of 28–45.

2. The battery separator of claim 1, wherein the polyolefin fibers are selected from a group comprising: polypropylene, bicomponent polypropylene/polyethylene and blends thereof.

3. The battery separator of claim 1, wherein the temperature applied to said nonwoven fibrous web 15 range between 250° F. and about 320° F.

4. The battery separator of claim 1, wherein the pressure applied to said nonwoven fibrous web 15 range between 18,000–50,000 psi.

5. The battery separator of claim 1, wherein said nonwoven fibrous web polyolefin fibers has a basis weight of approximately 30 to 40 gsy.

6. The battery separator of claim 1, wherein said pores have a mean dimension of approximately 1–12 microns, and the separator fabric has a percent void volume of approximately 32 percent.

7. The battery separator fabric of claim 1, wherein the fabric is seared by conveyance through an arrangement of spaced heated rolls in a machine direction ("MD"), and the separator fabric has an MD to cross-section ("CD") dry tensile strength of approximately 8/2 lbs/in.

8. The battery separator fabric of claim 7, wherein the temperature and pressure applied to said nonwoven fibrous web are, respectively, in the range of 250° F. to 320° F. and 18,000 to 50,000 psi.

9. The battery separator fabric of claim 8 for use in a lithium battery, wherein said pores have a mean dimension of approximately 1–12 microns, and the separator fabric has a percent void volume of approximately 32 percent.

10. A batter separator fabric for use in a lithium battery comprising:
    a nonwoven fibrous web of polyolefin fibers having top and bottom surface fibers and inner fibers, the surfaces of said top and bottom surface fibers being seared by heat and pressure causing only the surfaces of said top and bottom surface fibers to spread out contacting other surface fibers so as to form top and bottom film-like surfaces on said web, the original state of said fibers being otherwise substantially unaffected by said heat or pressure;
    the separator fabric being seared by conveyance through an arrangement of spaced heated rolls in a machine direction ("MD"), the separator fabric having a MD to cross-direction ("CD") dry tensile strength of approximately 8 and 2 lbs/in;
    said film-like surfaces having a plurality of pores disposed therein, said plurality of pores permitting ionic migration to occur in he lithium battery by allowing electrolytes to pass through said pores;
    said nonwoven fibrous web having a basis weight of approximately 30 to 40 gsy, and thickness, prior to being seared of 1–20 mils, such that the separator fabric has a thickness of approximately 2–3 mils, and per cent void volume in the range of 28–45.

11. The battery separator fabric of claim 10, wherein said pores have a mean dimension of approximately 1–12 microns, and the separator fabric has a percent void volume of approximately 32 percent.

12. A battery separator fabric for use in a battery comprising:
    a nonwoven fibrous web of polyolefin fibers, having top and bottom surface fibers and inner fibers, said nonwoven fibrous web having a basis weight of approximately 30 to 40 gsy, the surfaces of said top and bottom surface fibers being seared by heat and pressure, respectively, in the range of 250° F. to 320° F. and 18,000 to 50,000 psi, causing only the surfaces of said top and bottom surface fibers to spread out contacting other surface fibers so as to form top and bottom film-like surfaces on said web, the original state of said fibers being otherwise substantially unaffected by said heat or pressure;
    said film-like surfaces having a plurality of pores disposed therein, said pores have a mean dimension of approximately 1–12 microns, said plurality of pores permitting ionic migration to occur in the battery by allowing electrolytes to pass through said pores;
    said nonwoven fibrous web having a thickness prior to being seared of approximately 1–20 mils, such that the separator fabric has a thickness of approximately 2–3 mils, and percent void volume in the range of 28–45.

13. The battery separator of claim 12, wherein said fabric has a weight of approximately 36 gsy, said pores have a mean dimension of approximately 6.5 microns, and the separator fabric has a percent void volume of approximately 32 percent.

14. The battery separator of claim 13, wherein the fabric is seared by conveyance through an arrangement of spaced heated rolls in a machine direction ("MD"), and the separator fabric has an MD to cross-section ("CD") dry tensile strength of approximately 8/2 lbs/in.

* * * * *